United States Patent [19]
Kanazawa et al.

[11] Patent Number: 5,341,294
[45] Date of Patent: Aug. 23, 1994

[54] FOUR-WHEEL STEERING SYSTEM FOR VEHICLE

[75] Inventors: Hirotaka Kanazawa; Takeshi Edahiro; Hiroki Yoshioka; Nobuhiro Totoki; Hiroyuki Noda; Takashi Nakashima; Hiroshi Ohmura; Takeshi Murai; Ryuya Akita, all of Hiroshima, Japan

[73] Assignee: Mazda Motor Corporation, Hiroshima, Japan

[21] Appl. No.: 748,838

[22] Filed: Aug. 23, 1991

[30] Foreign Application Priority Data

Aug. 24, 1990 [JP] Japan ................... 2-223937
Aug. 24, 1990 [JP] Japan ................... 2-223938
Aug. 31, 1990 [JP] Japan ................... 2-230155

[51] Int. Cl.$^5$ .................... B62D 5/06; B62D 6/02
[52] U.S. Cl. ................... 364/424.05; 180/140; 280/91
[58] Field of Search ............ 364/424.05; 180/140, 180/141, 142, 79.1; 280/91

[56] References Cited

U.S. PATENT DOCUMENTS 4,732,231 3/1988 Kanazawa et al. ............... 180/140
4,942,532 7/1990 Mori .......................... 364/424.05
4,979,115 12/1990 Takahashi ..................... 364/424.05
5,020,619 6/1991 Kanazawa et al. ............... 180/140

FOREIGN PATENT DOCUMENTS 0331120 6/1989 European Pat. Off. .
57-44568 3/1982 Japan .
1273772 11/1989 Japan .
2083422 3/1992 United Kingdom .

Primary Examiner—Thomas G. Black
Assistant Examiner—Susan Wieland
Attorney, Agent, or Firm—Sixbey, Friedman, Leedom & Ferguson

[57] ABSTRACT

In a four wheel steering system, the rear wheel turning mechanism is connected to the front wheel turning mechanism by way of a rear wheel turning angle ratio changing mechanism which is mechanically connected to both the front wheel turning mechanism and the rear wheel turning mechanism and transmits the mechanical displacement input thereinto from the front wheel turning mechanism to the rear wheel turning mechanism to drive the same by an amount the ratio of which to the amount of mechanical displacement input into the rear wheel turning angle ratio changing mechanism gives a predetermined rear wheel turning angle ratio. The rear wheel turning angle ratio changing mechanism is controlled in such a way that, when the front wheels are turned from the neutral position in a middle vehicle speed range, makes the rear wheel turning angle ratio negative for a moment immediately after initiation of turning of the front wheels and thereafter turns the same positive.

17 Claims, 8 Drawing Sheets

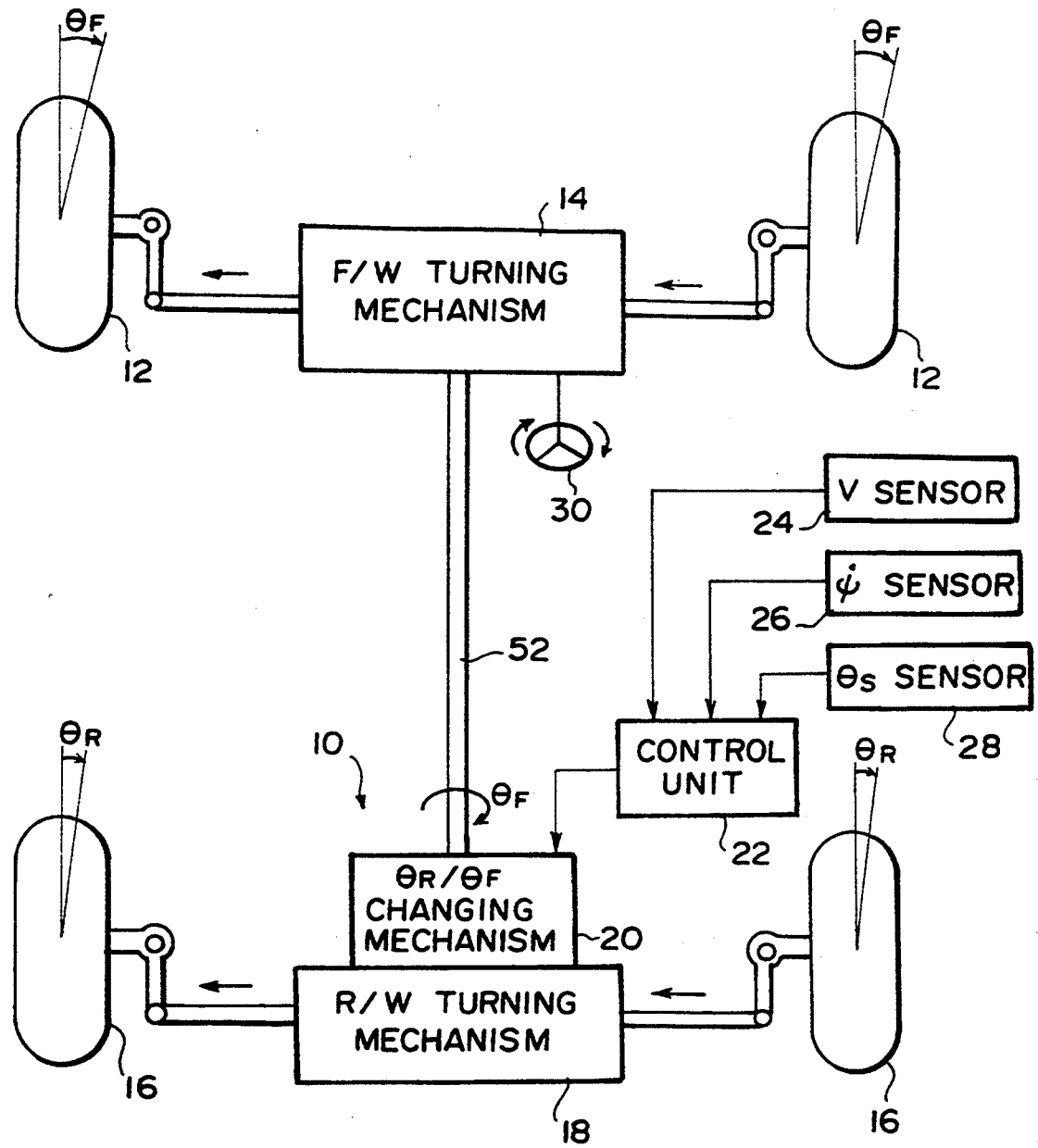

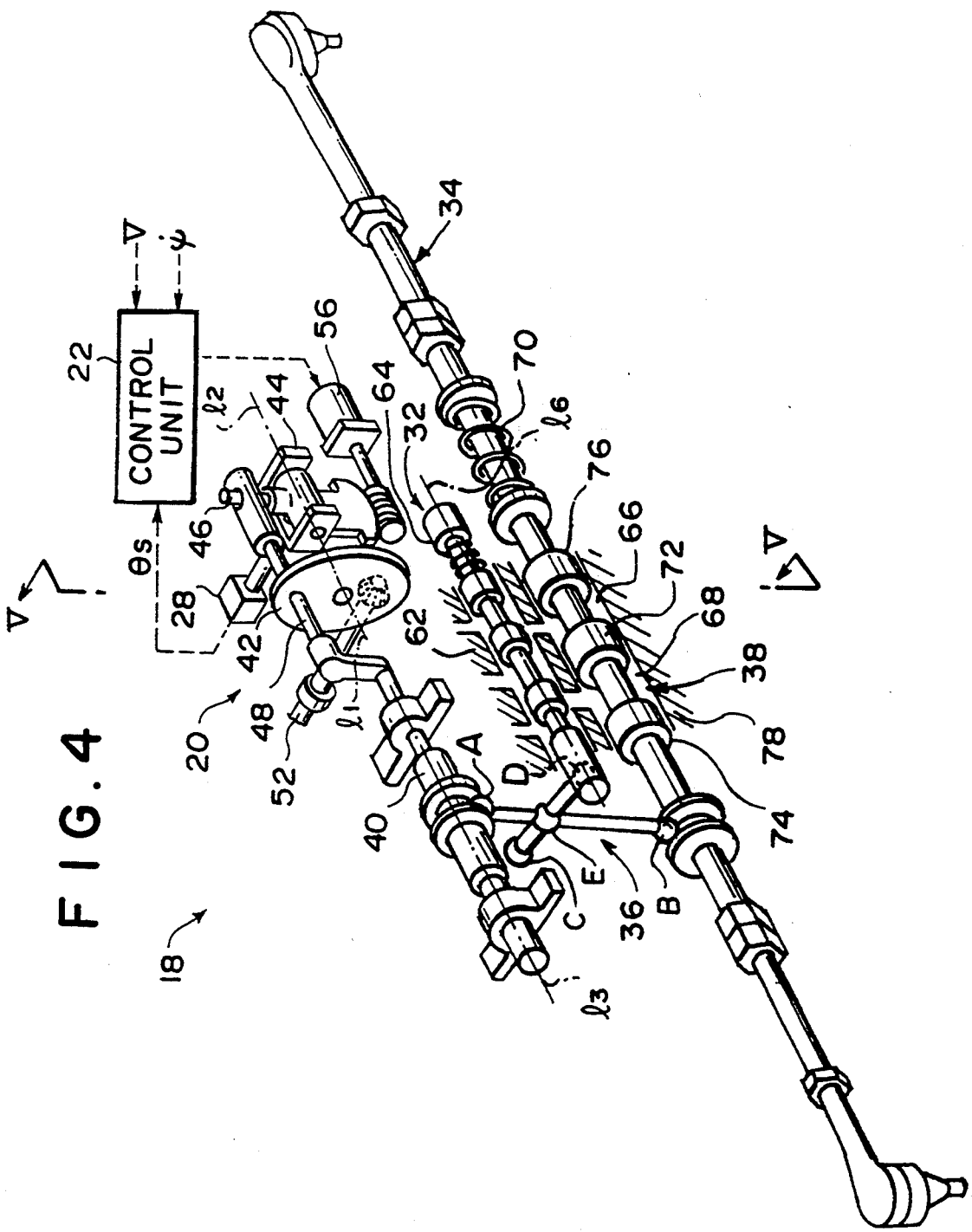

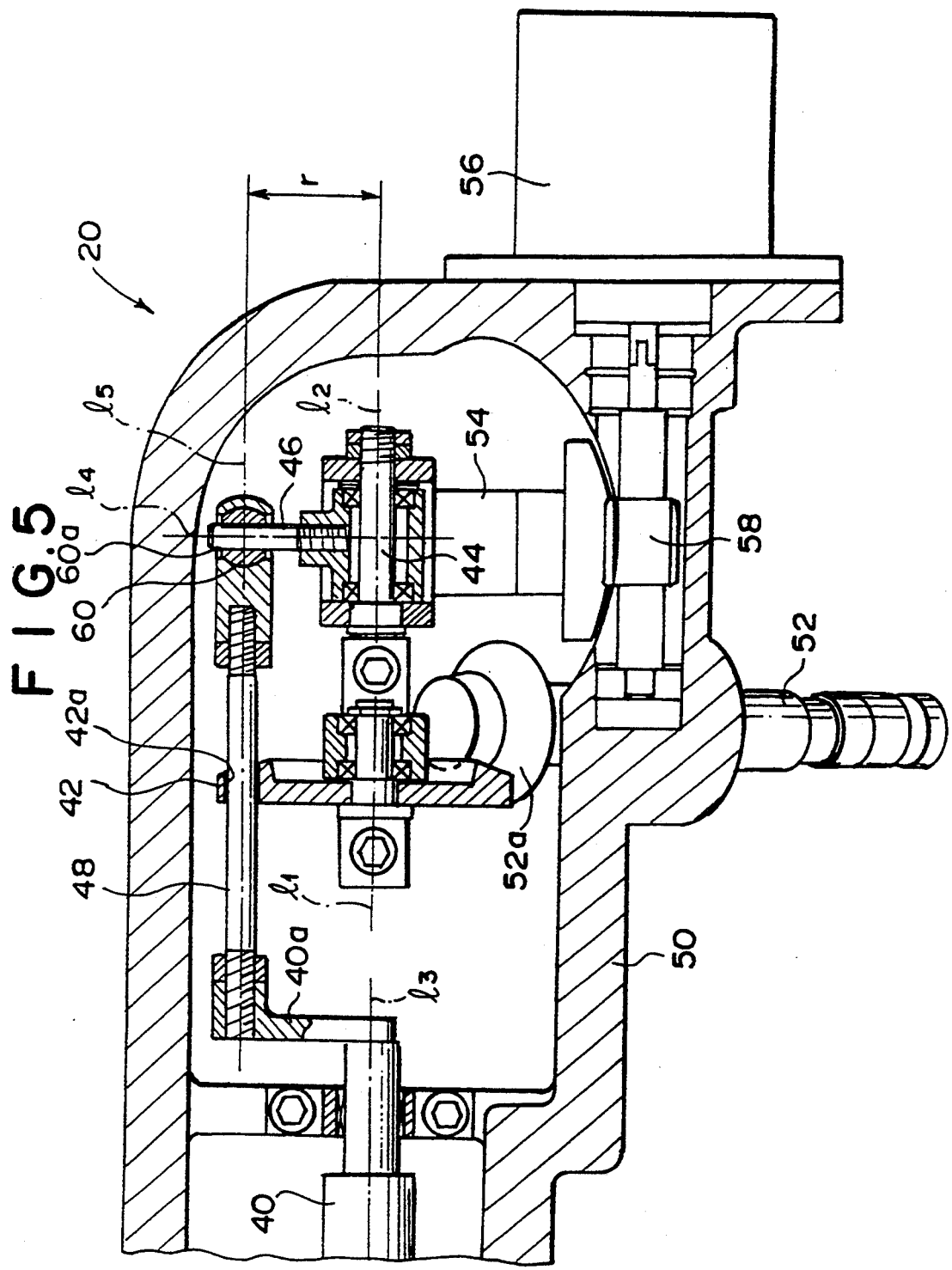

FOUR-WHEEL STEERING SYSTEM FOR VEHICLE

BACKGROUND OF THE INVENTION

1. Field of the Invention

This invention relates to a four-wheel steering system for a vehicle.

2. Description of the Prior Art

There has been known a four-wheel steering system in which the rear wheels are turned through an angle corresponding to the front wheel turning angle. Conventionally, the rear wheel turning angle is controlled by a proportional control on the basis of a predetermined rear wheel turning angle ratio (the ratio of the rear wheel turning angle to the front wheel turning angle) which is determined according to the vehicle speed or the like.

Generally the rear wheels are turned in the same direction as the front wheels (the same phase, the rear wheel turning angle ratio is positive) in the middle-to-high vehicle speed range in order to ensure running stability of the vehicle. However such a control is disadvantageous in that a satisfactory heading performance cannot be obtained since the rear wheel turning angle is controlled by a proportional control and accordingly the rear wheels are turned in the same phase simultaneously with initiation of turning the steering wheel.

The heading performance can be improved by detecting the yaw rate of the vehicle body and controlling the rear wheel turning angle on the basis of the detected yaw rate. For example, as disclosed in Japanese Unexamined Patent Publication No. 57(1982)-44568, when the rear wheels are turned on the basis of the following formula, the rear wheels are turned in the reverse phase (in the direction opposite to the turning direction of the front wheels, which is represented by a negative rear wheel turning angle ratio) for a moment immediately after initiation of turning of the front wheels from the neutral position (where the turning angle is zero) and then turned in the same phase in response to generation of a yaw rate, whereby both the heading performance and the running stability can be improved. Such a control is generally referred to as "phase inversion control".

$$TG\theta_R = -C_1 \cdot \theta_F + C_2 \cdot V \cdot \Psi'$$

wherein $TG\theta_R$ represents a target rear wheel turning angle, $\theta_F$ represents a front wheel turning angle, $V$ represents a vehicle speed, $\Psi'$ represents a yaw rate, and $C_1$ and $C_2$ respectively represent positive constants.

However since the conventional phase inversion control is effected in the four-wheel steering system in which the rear wheel turning mechanism is mechanically separated from the front wheel turning mechanism and is controlled by a control means into which a signal representing the front wheel turning angle is input and at the same time, the above formula includes a term which does not depend upon the front wheel turning angle $\theta_F$ ($C_2 \cdot V \cdot \Psi'$), sometimes the rear wheel turning angle $\theta_R$ cannot be zero even if the front wheel turning angle $\theta_F$ is zero. For example, when a side wind acts on the vehicle body and a yaw rate $\Psi$ is generated while the vehicle is running straight or when the yaw rate sensor fails, the rear wheel turning angle $\theta_R$ cannot be zero even if the front wheel turning angle $\theta_F$ is zero. If the rear wheels are turned independently of turning of the front wheels, the driver will be embarrassed. Further in the conventional phase inversion control, drift can occur if the control system fails.

SUMMARY OF THE INVENTION

In view of the foregoing observations and description, the primary object of the present invention is to provide a four-wheel steering system in which the phase inversion control can be effected without embarrassing the driver or deteriorating the driving stability of the vehicle.

In accordance with the present invention, the rear wheel turning mechanism is connected to the front wheel turning mechanism by way of a rear wheel turning angle ratio changing mechanism which is mechanically connected to both the front wheel turning mechanism and the rear wheel turning mechanism and transmits the mechanical displacement input thereinto from the front wheel turning mechanism to the rear wheel turning mechanism to drive the same by an amount the ratio of which to the amount of mechanical displacement input into the rear wheel turning angle ratio changing mechanism gives a predetermined rear wheel turning angle ratio. The rear wheel turning angle ratio changing mechanism is controlled in such a way that, when the front wheels are turned from the neutral position in a middle vehicle speed range, the rear wheel turning angle ratio turns negative for a moment immediately after initiation of turning of the front wheels and thereafter turns the same positive.

Such a control can be performed by controlling the rear wheel turning angle ratio changing mechanism on the basis of a target rear wheel turning angle ratio $TG\theta_S$ defined by, for instance, the following formula.

$$TG\theta_S = C_1 |\Psi'| - C_2 \tag{1}$$

wherein $\Psi'$ represents the yaw rate, and $C_1$ and $C_2$ respectively represent positive coefficients.

Instead of the target rear wheel turning angle ratio $TG\theta_S$ defined by formula (1), those respectively defined by the following formulae may be used.

$$TG\theta_S = f_1(V) + f_2(V) |\theta'_F| \tag{2}$$

wherein $\theta'_F$ represents the rate of change in the front wheel turning angle and $f_1(V)$ and $f_2(V)$ are functions of the vehicle speed $V$, ($f_1(V) > 0$, and $f_2(V) < 0$), $$TG\theta_S = f_1(V) |\theta_F| + f_2(V) |\theta'_F| \tag{3}$$

wherein $\theta_F$ represents the front wheel turning angle, $\theta'_F$ represents the rate of change in the front wheel turning angle and $f_1(V)$ and $f_2(V)$ are functions of the vehicle speed $V$, ($f_1(V) > 0$, and $f_2(V) < 0$).

$$TG\theta_S = f_1(V) + f_2(V) |\theta_F| + f_3(V) |\theta'_F| \tag{4}$$

wherein $\theta_F$ represents the front wheel turning angle, $\theta'_F$ represents the rate of change in the front wheel turning angle and $f_1(V)$, $f_2(V)$ and $f_3(V)$ are functions of the vehicle speed $V$, ($f_1(V) > 0$, $f_2(V) > 0$ and $f_3(V) < 0$).

$$TG\theta_S = C_1 |\Psi'| - C_2 |\theta_F| \tag{5}$$

wherein $\Psi'$ represents the yaw rate, $\theta_F$ represents the front wheel turning angle, and $C_1$ and $C_2$ respectively represent positive coefficients.

$$TG\theta_S = C_1 |\Psi'| - C_2 |\theta'_F| \tag{6}$$

wherein $\Psi'$ represents the yaw rate, $\theta'_F$ represents the rate of change in the front wheel turning angle and $C_1$ and $C_2$ respectively represent positive coefficients.

$$TG\theta_S = C_1|\Psi'| + C_2 - C_3|\theta_F| \quad (7)$$

wherein $\Psi'$ represents the yaw rate, $\theta_F$ represents the front wheel turning angle, and $C_1$, $C_2$ and $C_3$ respectively represent positive coefficients.

$$TG\theta_S = C_1|\Psi'| + C_2 - C_3|\theta'_F| \quad (8)$$

wherein $\Psi'$ represents the yaw rate, $\Psi'_F$ represents the rate of change in the front wheel turning angle and $C_1$, $C_2$ and $C_3$ respectively represent positive coefficients.

$$TG\theta_S = C_1|\Psi'| + C_2 - C_3|\theta_F| - C_4|\theta'_F| \quad (9)$$

wherein $\Psi'$ represents the yaw rate, $\theta_F$ represents the front wheel turning angle, $\theta'_F$ represents the rate of change in the front wheel turning angle and $C_1$, $C_2$, $C_3$ and $C_4$ respectively represent positive coefficients.

In the four-wheel steering system of this embodiment, the rear wheels can be surely held in the neutral position where the turning angle is zero when the front wheels are in the neutral position since the rear wheel turning mechanism is connected to the front wheel turning mechanism by way of the rear wheel turning angle ratio changing mechanism which is mechanically connected to both the front wheel turning mechanism and the rear wheel turning mechanism and the phase inversion control is effected by control of the rear wheel turning angle ratio changing mechanism. In accordance with the present invention, the phase inversion control can be effected without embarrassing the driver or deteriorating the driving stability of the vehicle.

When the front wheel turning angle is zero, the rear wheel turning angle is surely held at zero, and accordingly, the rear wheels are never turned without driver's intention of steering the vehicle. Further even if an abnormality occurs in the control system, the rear wheels are never turned independently from the front wheels, and accordingly, the driving stability and safety can be ensured.

Further, in accordance with the present invention, since the rear wheel turning angle ratio changing mechanism can be caused to wait in a position where a predetermined rear wheel turning angle ratio can be obtained while the vehicle is running straight, the response to the phase inversion control can be improved as compared with the conventional system. Accordingly hunting of the control system due to time lag in response is prevented and the control system can be simplified.

Further, in accordance with the present invention, the rear wheel turning angle is not directly controlled but controlled by way of the rear wheel turning angle ratio. That is, the target rear wheel turning angle $TG\theta_R$ is given by formula $TG\theta_R = \theta_F TG\theta_S$.

The front wheel turning angle $\theta_F$ is mechanically input into the rear wheel turning angle ratio changing mechanism and has a directional component. Accordingly, it is not necessary to determine whether the target rear wheel turning angle ratio $TG\theta_S$ is to be positive or negative. For example, the direction of the yaw rate $\Psi'$, front wheel turning angle $\theta_F$ or the rate of change in the front wheel turning angle $\theta'_F$ need not be determined so long as the absolute value can be determined, which permits further simplification of the control system.

BRIEF DESCRIPTION OF THE DRAWINGS

FIG. 1 is a schematic showing a four-wheel steering system in accordance with a first embodiment of the present invention, FIG. 4 is a schematic perspective view showing the rear wheel turning angle ratio changing mechanism and the rear wheel turning mechanism, FIG. 5 is a cross-sectional view taken along line V—V in FIG. 4, FIGS. 6a and 6b are views showing the characteristics of the coefficients employed in a second embodiment.

DESCRIPTION OF THE PREFERRED EMBODIMENTS

Figure 2A:
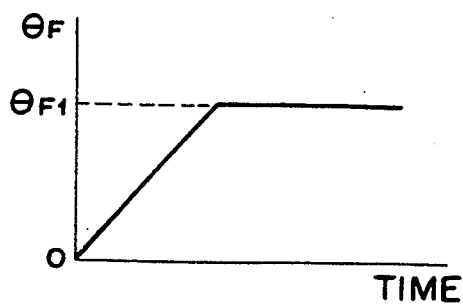
FIGS. 2a and 2b are views for illustrating a typical example of the phase inversion control.

In FIG. 1, a four-wheel steering system in accordance with a first embodiment of the present invention comprises a front wheel turning mechanism 14 which turns front wheels 12 in response to turning a steering wheel 30, and a rear wheel turning mechanism 18 which is connected to the front wheel turning mechanism 14 by way of a rear wheel turning angle ratio changing mechanism 20 which is mechanically connected to both the front wheel turning mechanism 14 and the rear wheel turning mechanism 18. The rear wheel turning angle ratio changing mechanism 20 is connected to the front wheel turning mechanism 14 by way of a relay shaft 52 and transmits the angular displacement of the relay shaft 52 to the rear wheel turning mechanism 18 to drive the same by an amount the ratio of which to the amount of the angular displacement of the relay shaft 52 gives a predetermined rear wheel turning angle ratio $\theta_S$. The angular displacement of the relay shaft 52 represents the front wheel turning angle $\theta_F$ and the amount by which the rear wheel turning mechanism 18 is driven represents the rear wheel turning angle $\theta_R$. The rear wheel turning angle ratio changing mechanism 20 is arranged so that the ratio of the amount by which the rear wheel turning mechanism 18 is driven to the amount of the angular displacement of the relay shaft 52, i.e., the rear wheel turning angle ratio $\theta_S$, can be changed and a control unit 22 causes the the rear wheel turning angle ratio changing mechanism 20 to change the rear wheel turning angle ratio $\theta_S$ according to the running condition of the vehicle. Signals representing the vehicle speed V, the yaw rate $\Psi'$ and the rear wheel turning angle ratio $\theta_S$ are input into the control unit 22 from a vehicle speed sensor 24, a yaw rate sensor 26 and a rear wheel turning angle ratio sensor 28.

Figure 2B:
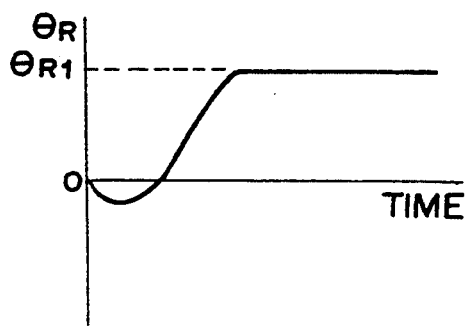

When the front wheels 12 are turned from the neutral position in a middle vehicle speed range, the control unit 22 causes the rear wheel turning angle ratio changing mechanism 20 to make the rear wheel turning angle ratio $\theta_S$ negative for a moment immediately after initiation of turning of the front wheels and thereafter turns the same positive. For example, when the steering wheel 30 is turned and the front wheel turning angle $\theta_F$ changes stepwise from zero to a predetermined angle $\theta_{F1}$ as shown in FIG. 2a, the rear wheel turning angle ratio $\theta_S$ is caused to change once to negative and then to a predetermined value $\theta_{R1}$ which is positive as shown in FIG. 2b.

For this purpose, in this particular embodiment, the control unit 22 controls the rear wheel turning angle ratio changing mechanism 20 on the basis of a target rear wheel turning angle ratio TG$\theta_S$ defined by the following formula.

$$TG\theta_S = f_1(V)|\Psi'| + f_2(V) \quad (1)$$

wherein $\Psi'$ represents the yaw rate, and $f_1(V)$ and $f_2(V)$ represent coefficients which are functions of the vehicle speed V, ($f_1(V)>0$, and $f_2(V)<0$).

The target rear wheel turning angle TG$\theta_R$ is given by formula $$TG\theta_R = \theta_F \cdot TG\theta_S.$$

The front wheel turning angle $\theta_F$ is mechanically input into the rear wheel turning angle ratio changing mechanism 20 as described above.

Figure 3A:
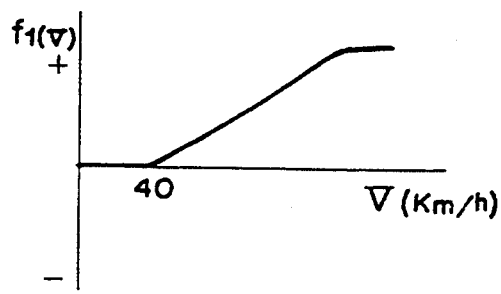
FIGS. 3a and 3b are views showing the characteristics of the coefficients employed in the first embodiment.
Figure 3B:
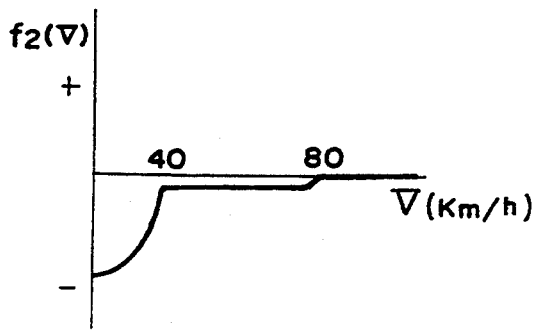

The coefficients $f_1(V)$ and $f_2(V)$ are related to the vehicle speed V respectively as shown in FIGS. 3a and 3b. When the characteristics of the coefficients $f_1(V)$ and $f_2(V)$ are as shown in FIGS. 3a and 3b, in a middle vehicle speed range (40 to 80 Km/h), the target rear wheel turning angle ratio TG$\theta_S$ is determined solely according to the value of the coefficient $f_2(V)$ and is negative for a moment immediately after initiation of turning of the front wheels, when the yaw rate $\Psi'$ is not generated yet, and thereafter the target rear wheel turning angle ratio TG$\theta_S$ increases to positive as the yaw rate $\Psi'$ is generated and increases.

Figure 3C:
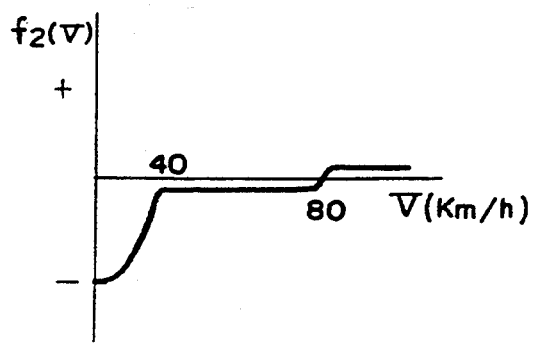
FIG. 3c is a view similar to FIG. 3b but showing a modification thereof.

The characteristics of the coefficients $f_1(V)$ and $f_2(V)$ are shown in FIGS. 3a and 3b for a low vehicle speed range lower than 40 Km/h and a high vehicle speed range higher than 80 Km/h is not for the purpose of effecting the phase inversion control also in the low and high vehicle speed range but for effecting control of the rear wheel turning angle ratio $\theta_S$ required in each vehicle speed range by the use of the formula (1). In the low vehicle speed range, the rear wheel turning angle ratio $\theta_S$ is made negative in order to improve the heading performance and in the high vehicle speed range, the rear wheel turning angle ratio $\theta_S$ is made positive in order to improve the directional stability. In the high vehicle speed range, the rear wheel turning angle ratio $\theta_S$ is made zero for a moment immediately after initiation of turning of the front wheels and then is turned positive. For this purpose, the coefficient $f_2(V)$ is set to zero in the high vehicle speed range as shown in FIG. 3b. When the running stability in the high vehicle speed range is especially desired, the coefficient $f_2(V)$ may be made positive in the high vehicle speed range as shown in FIG. 3c.

The rear wheel turning mechanism 18 comprises a hydraulic changeover valve 32, a rear wheel turning rod 34, a displacement transmitting means 36 and a hydraulic power cylinder 38 as shown in FIG. 4.

The rear wheel turning angle ratio changing mechanism 20 comprises an output rod 40, a bevel gear 42, a pivotal shaft member 44, a pendulum arm 46 and a connecting rod 48 which are housed in a casing 50 as shown in FIG. 5.

The output rod 40 is supported by the casing 50 and is slidable in the direction of its longitudinal axis 13. When the output rod 40 is displaced in the direction of the axis 13, the displacement is transmitted to the rear wheel turning rod 34 by way of the displacement transmitting means 36 and displaces the rear wheel turning rod 34 in the direction of its longitudinal axis (in the direction transverse to the vehicle body), whereby the rear wheels connected to opposite ends of the rear wheel turning rod 34 are turned.

The bevel gear 42 is supported by the casing 50 and is rotatable about an axis 11 which is in alignment with the axis 13. A pinion 52a fixed to the rear end of the relay shaft 52 is in mesh with the bevel gear 42 and the bevel gear 42 is rotated about the axis 11 when the steering wheel is turned and the relay shaft 52 is rotated.

The pivotal shaft member 44 is supported for rotation about a vertical rotational axis which is perpendicular to the axes 11 and 13. The pendulum arm 46 is connected to the pivotal shaft member 44 so that it can rotate the longitudinal axis 12 of the pivotal shaft member 44 which extends in a horizontal direction and is adapted to be aligned with the axis 13 of the output rod 40. The pendulum arm 46 extends in a plane which includes the vertical rotational axis of the pivotal shaft member 44 and is perpendicular to the axis 13 of the output rod 40. A gear 54 is fixed to the pivotal shaft member 44 and is in mesh with a worm 58 which is driven by a servo motor 56. When the servo motor 56 rotates, the pivotal shaft member 44 is rotated about the vertical rotational axis.

The connecting rod 48 has a longitudinal axis 15 which is parallel to the axis 13 of the output rod 40. One end of the connecting rod 48 is fixedly connected to a lever 40a which is connected to an end of the output rod 40 so that it can rotate about the axis 13 of the output rod 40 relative to the output rod 40. The other end of the connecting rod 48 is connected to the free end of the pendulum arm 46 by slidably inserting the pendulum arm 46 into a hole 60a formed in a ball joint 60 which is mounted on the other end of the connecting rod 48 to be rotatable in any direction. The connecting rod 48 extends through a hole 42a formed in the bevel gear 42 and is movable in the direction of the longitudinal axis 15 relative to the bevel gear 42.

When the front wheels are turned and the relay shaft 52 is rotated, the bevel gear 42 is rotated about the axis 11 which is in alignment with the axis 13 of the output rod 40 and the connecting rod 48 is rotated about the axis 13. Since the connecting rod 48 is movable in the direction of the axis 13 and the end of the connecting rod 48 is connected to the free end of the pendulum arm 46 which is rotatable about the axis 12 but cannot move in the direction of the axis 13, the end of the connecting rod 48 is guided by the free end of the pendulum arm 46 when the connecting rod 48 is rotated about the axis 13.

When the axis 12 of the pivotal shaft member 44 is in alignment with the axis 13 of the output shaft 40 as shown in FIG. 5, the free end of the pendulum arm 46 and accordingly the end of the connecting rod 48 rotate in a plane parallel to the plane in which the bevel gear 42 rotates. Accordingly, in such a case, the output rod 40 is not displaced in the direction of the axis 13 when the relay shaft 52 rotates and accordingly the rear wheels are not turned irrespective of the value of the front wheel turning angle, i.e., the rear wheel turning angle ratio is zero.

On the other hand, when the axis 12 of the pivotal shaft member 44 is at an angle $\theta$ to the axis 13 of the output shaft 40, the free end of the pendulum arm 46 and the end of the connecting rod 48 rotate in a plane inclined to the plane in which the bevel gear 42 rotates, and the free end of the pendulum arm 46 and the end of the connecting rod 48 move in the direction of the axis 13 during rotation, whereby the output rod 40 is displaced in the direction of the axis 13. The amount of the displacement of the output rod 40 for a given rotation of the relay shaft 52 depends upon the value of the angle $\theta$ and the direction of the displacement of the output rod 40 for the rotation of the relay shaft 52 in a given direction depends upon the direction of the angle $\theta$.

Accordingly, by changing the angle $\theta$ by way of the servo motor 56, the rear wheel turning angle ratio $\theta_S$ can be changed. Further changing the direction in which the pivotal shaft member 44 is rotated, the direction of displacement of the output rod 40 in response to rotation of the relay shaft 52 in a given direction can be changed, whereby the rear wheels can be turned either in the same phase or the reverse phase.

The rear wheel turning angle ratio $\theta_S$ which is set by the rear wheel turning angle ratio changing mechanism 20 is detected by the rear wheel turning angle ratio sensor 28 mounted on the pivotal shaft member 44 through the angle $\theta$ of inclination of the pivotal shaft member 44.

The hydraulic changeover valve 32 comprises a valve housing 62 and a spool 64 which is accommodated in the valve housing and is slidable in the direction of its longitudinal axis 16 which is parallel to the axis 13 of the output rod 40. The spool 64 is displaced by the output rod 40 and the rear wheel turning rod 34 by way of the displacement transmitting means 36. Feed of the hydraulic pressure to the hydraulic power cylinder 38 is controlled by displacement of the spool 64.

The hydraulic power cylinder 38 has a housing 78 and a pair of seal members 74 and 76 which are fixed to the housing 78 and are slidably fitted on the rear wheel turning rod 34 spaced from each other in the longitudinal direction of the rod 34. A piston 72 is fixed to the rear wheel turning rod 34 between the seal members 74 and 76, whereby left and right hydraulic pressure chambers 68 and 66 are formed on opposite sides of the piston 72. When the spool 64 is displaced rightward from the neutral position shown in FIG. 4, hydraulic pressure is fed to the right pressure chamber 66 to displace the rear wheel turning rod 34 leftward. On the other hand, when the spool 64 is displaced leftward from the neutral position shown in FIG. 4, hydraulic pressure is fed to the left pressure chamber 68 to displace the rear wheel turning rod 34 rightward.

The rear wheel turning rod 34 extends in the transverse direction of the vehicle body in parallel to the axis 13 of the output rod 40. When the rear wheel turning rod 34 is displaced in the transverse direction of the vehicle body, the rear wheels connected to the ends of the rod 34 by way of tie rods and knuckle arms (not shown) are turned. The rear wheel turning rod 34 is provided with a centering spring 70 which urges the rod 34 to the neutral position where the rear wheels are held in the straight ahead position. When the hydraulic system for the power cylinder 38 such as the valve 34 fails and hydraulic pressure in the power cylinder 38 is lost or when the mechanical system of the rear wheel turning mechanism 18 fails and hydraulic pressure is drained from the hydraulic system for the power cylinder 38, the centering spring 70 returns the rod 34 to the neutral position and holds it there.

The displacement transmitting means 36 is engaged with the output rod 40, the spool 64 and the rear wheel turning rod 34, and displaces the spool 64 in one direction in response to displacement of the output rod 40 and displaces same in the other direction in response to displacement of the rear wheel turning rod 34 which is produced by displacement of the spool 64 in said one direction.

The displacement transmitting means 36 is in the form of a cross having a vertical lever and a horizontal lever. One end A of the vertical lever is engaged with the output rod 40 and the other end B of the same is engaged with the rear wheel turning rod 34. One end C of the horizontal lever is engaged with the casing of the rear wheel turning mechanism 18 which is fixed to the vehicle body, and the other end D of the horizontal lever is engaged with the spool 64. The ends A, B and D are not movable respectively relative to the output rod 40, the rear wheel turning rod 34 and the spool 64 in the directions of the respective longitudinal axes but are movable in the other directions and rotatable. The end C is connected to the casing of the rear wheel turning mechanism 18 to be rotatable but not movable relative to the casing.

When the output rod 40 is displaced in the direction of the axis 13, the rear wheel turning rod 34 is displaced in the longitudinal direction by way of the displacement transmitting member 36 by an amount which turns the rear wheels by an angle which is equal to the product of the front wheel turning $\theta_F$ mechanically input into the rear wheel turning angle ratio changing mechanism 20 and the rear wheel turning angle ratio $\theta_S$ set by the rear wheel turning angle ratio changing mechanism 20 under the control of the control unit 22. The principle of transmitting the front wheel turning $\theta_F$ to the rear wheel turning rod 34 does not directly concern the present invention and is disclosed in detail in Japanese Unexamined Patent Publication No. 1(1989)-273772, and accordingly will not be described in more detail here.

A second embodiment of the present invention will be described with reference to FIGS. 6a and 6b, hereinbelow.

The four-wheel steering system in accordance with the second embodiment is mechanically substantially the same as the first embodiment except that a front wheel turning angle sensor is connected to the control unit 22 instead of the yaw rate sensor 26.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V) + f_2(V)|\theta'_F| \quad (2)$$

wherein $\theta'_F$ represents the rate of change in the front wheel turning angle and $f_1(V)$ and $f_2(V)$ are functions of the vehicle speed V, ($f_1(V)>0$, and $f_2(V)<0$).

Figure 6A:
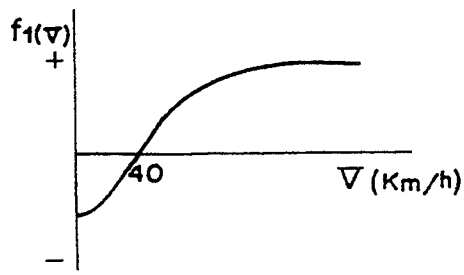
Figure 6B:
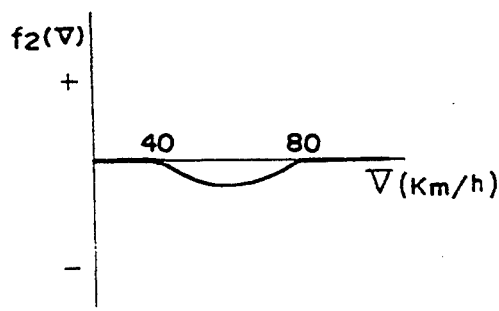

In this embodiment, the coefficients $f_1(V)$ and $f_2(V)$ are related to the vehicle speed V respectively as shown in FIGS. 6a and 6b. When the characteristics of the coefficients $f_1(V)$ and $f_2(V)$ are as shown in FIGS. 6a and 6b, though the target rear wheel turning angle ratio $TG\theta_S$ is basically determined by the coefficient $f_1(V)$, the target rear wheel turning angle ratio $TG\theta_S$ is determined taking into account the rate of change $\theta'_F$ of the front wheel turning angle, i.e., the steering wheel turning speed in a middle vehicle speed range (40 to 80 Km/h) since the value of the coefficient $f_2(V)$ is not zero. In the middle speed range, the target rear wheel turning angle ratio $TG\theta_S$ is determined according to the sum of the coefficient $f_1(V)$ (>0) and the coefficient $f_2(V)$. Accordingly the target rear wheel turning angle ratio $TG\theta_S$ is negative for a moment and thereafter increases to positive when the steering wheel is turned quickly from the neutral position.

This embodiment is advantageous over the first embodiment in that no yaw rate sensor, which is expensive, is required.

Further, in this embodiment, the rear wheel turning angle ratio is reduced for a moment when the steering wheel is further turned during steady cornering, whereby the heading performance in such a case can also be improved.

A third embodiment of the present invention will be described with reference to FIGS. 7a and 7b, hereinbelow.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V)|\theta_F| + f_2(V)|\theta'_F| \quad (3)$$

wherein $\theta_F$ represents the front wheel turning angle, $\theta'_F$ represents the rate of change in the front wheel turning angle and $f_1(V)$ and $f_2(V)$ are functions of the vehicle speed V, ($f_1(V)>0$, and $f_2(V)<0$).

Figure 7A:
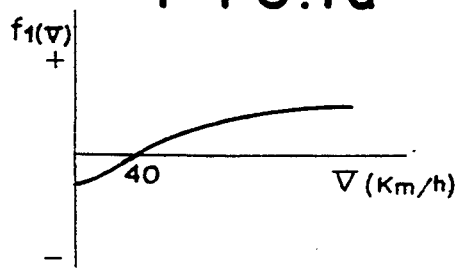
FIGS. 7a and 7b are views showing the characteristics of the coefficients employed in a third embodiment.
Figure 7B:
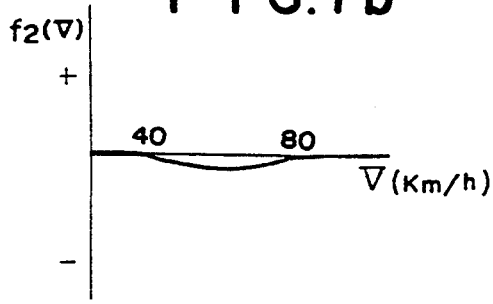

In this embodiment, the coefficients $f_1(V)$ and $f_2(V)$ are related to the vehicle speed V respectively as shown in FIGS. 7a and 7b.

In accordance with the formula (3), by virtue of $|\theta_F|$ by which the coefficient $f_1(V)$ is multiplied, the phase inversion control can be effected at lower cost than in accordance with the formula (2) (the second embodiment) and hunting of the control can be suppressed.

The coefficient $f_1(V)$ in the formula (2) is set to be larger than 0 in the middle vehicle speed range in order to ensure directional stability of the vehicle. Accordingly, the target rear wheel turning angle ratio $TG\theta_S$ is kept positive during straight travel of the vehicle, and accordingly, the rear wheel turning angle ratio changing mechanism 20 must be quickly driven so that the rear wheel turning angle ratio $\theta_S$ turns from positive to negative in a moment when the steering wheel is turned and the target rear wheel turning angle ratio $TG\theta_S$ changes to negative. For this purpose, quicker response of the system is required, which adds to the cost and can involve hunting of the control.

On the other hand, when $f_1(V)|\theta_F|$ is used instead of $f_1(V)$, the target rear wheel turning angle ratio $TG\theta_S$ is kept zero during straight travel of the vehicle, and accordingly, the response of the system need not be so quick, whereby the phase inversion control can be effected at low cost and hunting of the control can be suppressed.

A fourth embodiment of the present invention will be described with reference to FIGS. 8a to 8c, hereinbelow.

In this embodiment, the control unit 22 controls the rear wheel turning angle ratio changing mechanism 20 on the basis of a target rear wheel turning angle ratio $TG\theta_S$ defined by the following formula.

$$TG\theta_2 = f_1(V) + f_2(V)|\theta_F| + f_3(V)|\theta'_F| \quad (4)$$

wherein $\theta_F$ represents the front wheel turning angle, $\theta'_F$ represents the rate of change in the front wheel turning angle and $f_1(V)$, $f_2(V)$ and $f_3(V)$ are functions of the vehicle speed V, ($f_1(V)>0$, $f_2(V)>0$ and $f_3(V)<0$).

Figure 8A:
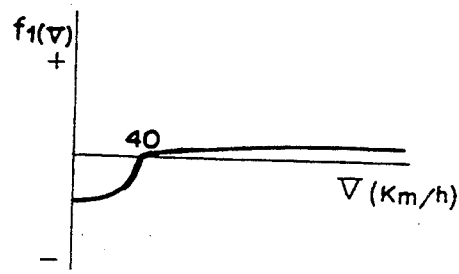
FIGS. 8a to 8c are views showing the characteristics of the coefficients employed in a fourth embodiment.
Figure 8B:
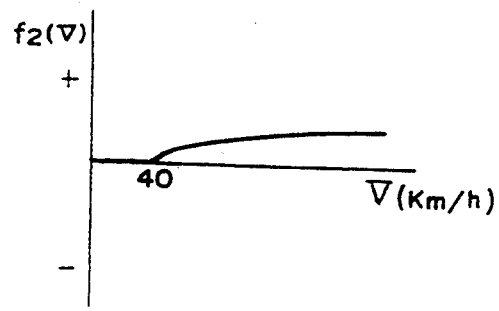
Figure 8C:
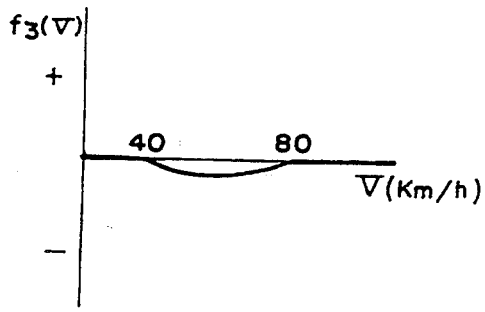

In this embodiment, the coefficients $f_1(V)$, $f_2(V)$ and $f_3(V)$ are related to the vehicle speed V respectively as shown in FIGS. 8a to 8c.

In accordance with the formula (4), by existence of the first term $f_1(V)$ on the right side, the running stability during straight travel can be improved in addition to the effect equivalent to that obtained in the third embodiment.

That is, though, in the third embodiment, the target rear wheel turning angle ratio $TG\theta_S$ is kept zero during straight travel of the vehicle, the running stability during straight travel is improved by keeping the target rear wheel turning angle ratio $TG\theta_S$ zero during straight travel of the vehicle in this embodiment. Though the target rear wheel turning angle ratio $TG\theta_S$ is kept zero during straight travel of the vehicle also in the second embodiment, the first term $f_1(V)$ in this embodiment may be small so long as it can improve the running stability during straight travel since the directional stability can be ensured by the second term $f_2(V)|\theta_F| + f_3(V)|\theta'_F|$.

A fifth embodiment of the present invention will be described with reference to FIGS. 9a to 9c, hereinbelow.

The four-wheel steering system in accordance with the fifth embodiment is mechanically substantially the same as the first embodiment except that a front wheel turning angle sensor is connected to the control unit 22.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V)|\Psi'| + f_2(V)|\theta_F| \quad (5)$$

wherein $\Psi'$ represents the yaw rate, $\theta_F$ represents the front wheel turning angle, and $f_1(V)$ and $f_2(V)$ represent coefficients which are functions of the vehicle speed V.

Figure 9A:
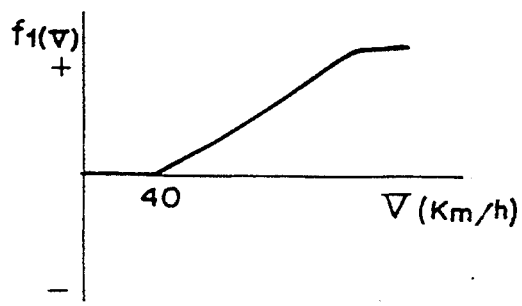
FIGS. 9a and 9b are views showing the characteristics of the coefficients employed in a fifth embodiment.
Figure 9B:
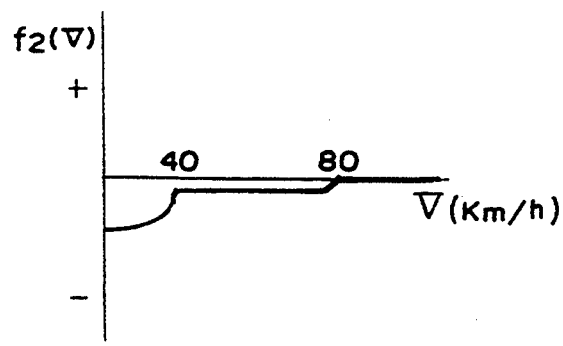
Figure 9C:
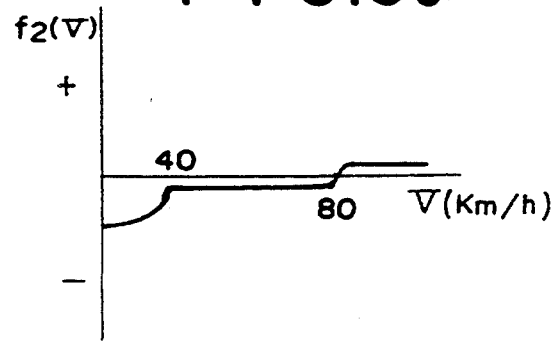
FIG. 9c is a view similar to FIG. 9b but showing a modification thereof.

The coefficients $f_1(V)$ and $f_2(V)$ are related to the vehicle speed V respectively as shown in FIGS. 9a and 9b. When the characteristics of the coefficients $f_1(V)$ and $f_2(V)$ are as shown in FIGS. 9a and 9b, in a middle vehicle speed range (40 to 80 Km/h), the target rear wheel turning angle ratio $TG\theta_S$ is determined solely according to the value of the term $f_2(V)|\theta_F|$ ($<0$) and is negative for a moment immediately after initiation of turning of the front wheels, when the yaw rate $\Psi'$ is not generated yet, and thereafter the target rear wheel turning angle ratio $TG\theta_S$ increases to positive as the yaw rate $\Psi'$ is generated and increases.

This embodiment is advantageous over the first embodiment wherein the second term is simply $f_2(V)$ as follows.

When the second term is simply $f_2(V)$, the target rear wheel turning angle ratio $TG\theta_S$ is kept negative during straight travel of the vehicle, and the vehicle can behave too sensitively when the front wheel turning angle $\theta_F$ changes frequently in a small angle range in response to fine turning of the steering wheel. However, when the second term is $f_2(V)|\theta_F|$, the value of the second term is very small and the value of the target rear wheel turning angle ratio $TG\theta_S$ is substantially zero so long as the front wheel turning angle $\theta_F$ is small, whereby the running stability during straight travel can be ensured. On the other hand, as the front wheel turning angle $\theta_F$ increases, the value of the second term increases. Accordingly, when the driver wants to turn the vehicle (i.e., the front wheel turning angle $\theta_F$ is large), satisfactory heading performance is ensured.

That the characteristics of the coefficients $f_1(V)$ and $f_2(V)$ are shown in FIGS. 9a and 9b also for the low vehicle speed range and the high vehicle speed range is not for the purpose of effecting the phase inversion control also in the low and high vehicle speed range but for effecting control of the rear wheel turning angle ratio $\theta_S$ required in each vehicle speed range by the use of the formula (5). In the low vehicle speed range, the rear wheel turning angle ratio $\theta_S$ is made negative in order to improve the heading performance and in the high vehicle speed range, the rear wheel turning angle ratio $\theta_S$ is made positive in order to improve the directional stability. In the high vehicle speed range, the rear wheel turning angle ratio $\theta_S$ is made zero for a moment immediately after initiation of turning of the front wheels and then is turned positive. For this purpose, the coefficient $f_2(V)$ is set to zero in the high vehicle speed range as shown in FIG. 9b. When the running stability in the high vehicle speed range is especially desired, the coefficient $f_2(V)$ may be made positive in the high vehicle speed range as shown in FIG. 9c.

Figure 10A:
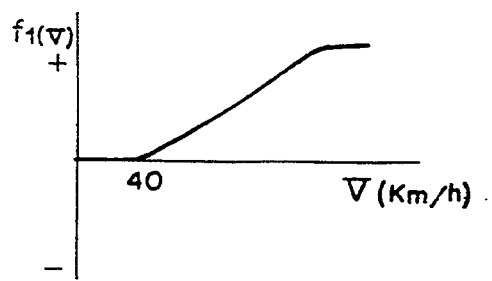
FIGS. 10a and 10b are views showing the characteristics of the coefficients employed in a sixth embodiment.
Figure 10B:
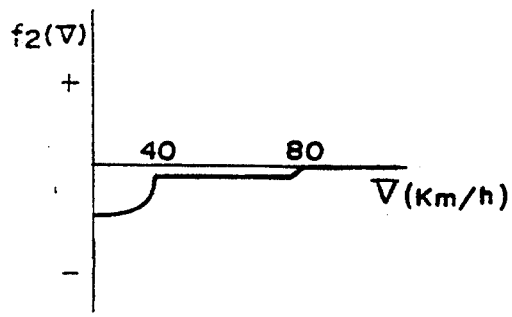

A sixth embodiment of the present invention will be described with reference to FIGS. 10a and 10b, hereinbelow.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V)|\Psi'| + f_2(V)|\theta'_F| \quad (6)$$

wherein $\Psi'$ represents the yaw rate, $\theta'_F$ represents the rate of change in-the front wheel turning angle and $f_1(V)$ and $f_2(V)$ represent coefficients which are functions of the vehicle speed V.

In accordance with the formula (6), by existence of $|\theta'_F|$ in the second term on the right side, the response of the rear wheel turning immediately after turning the front wheels is improved and the driving feeling can be approximated to driver's will. That is, it may be considered that the rate of change $\theta'_F$ in the front wheel turning angle represents the driver's will, and accordingly, the driving feeling can be approximated to driver's will by taking into account the rate of change $\theta'_F$ in the front wheel turning angle.

Further, in this embodiment, the rear wheel turning angle ratio is reduced for a moment when the steering wheel is further turned during steady cornering, whereby the heading performance in such a case can also be improved.

A seventh embodiment of the present invention will be described with reference to FIGS. 11a to 11c, hereinbelow.

In this embodiment, the control unit 22 controls the rear wheel turning angle ratio changing mechanism 20 on the basis of a target rear wheel turning angle ratio $TG\theta_S$ defined by the following formula:

$$TG\theta_S = f_1(V)|\Psi'| + f_2(V) + f_3(V)|\theta_F| \quad (7)$$

wherein $\Psi'$ represents the yaw rate, $\theta_F$ represents the front wheel turning angle, and $f_1(V)$, $f_2(V)$ and $f_3(V)$ represent coefficients which are functions of the vehicle speed V.

Figure 11A:
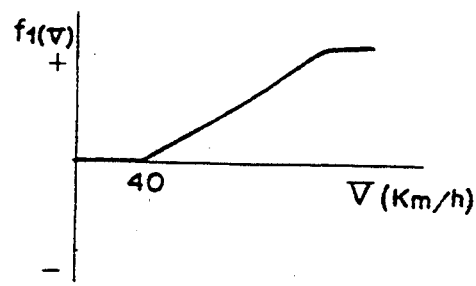
FIGS. 11a to 11c are views showing the characteristics of the coefficients employed in a seventh embodiment.
Figure 11B:
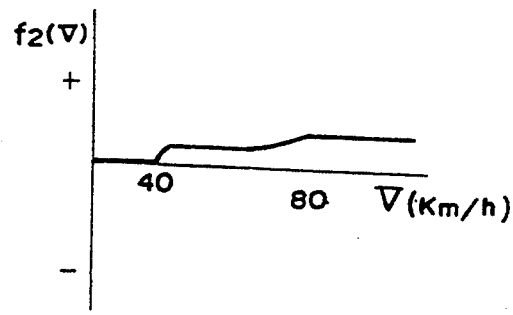
Figure 11C:
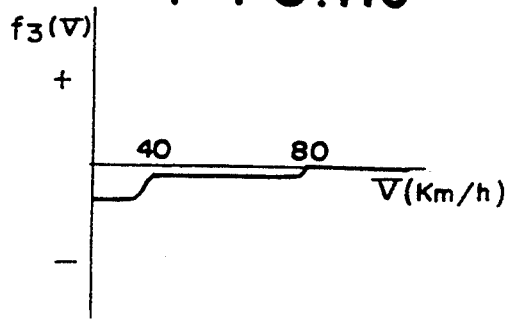

In this embodiment, the coefficients $f_1(V)$, $f_2(V)$ and $f_3(V)$ are related to the vehicle speed V respectively as shown in FIGS. 11a to 11c.

In accordance with the formula (7), by existence of $f_2(V)$ in the second term on the right side, the target rear wheel turning angle ratio $TG\theta_S$ can be kept positive during straight travel of the vehicle and accordingly, running stability during straight travel can be improved in addition to the effect obtained in the sixth embodiment.

An eighth embodiment of the present invention will be described with reference to FIGS. 12a to 12c, hereinbelow.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V)|\Psi'| + f_2(V) + f_3(V)|\theta'_F| \quad (8)$$

wherein $\Psi'$ represents the yaw rate, $\theta'_F$ represents the rate of change in the front wheel turning angle, and $f_1(V)$, $f_2(V)$ and $f_3(V)$ represent coefficients which are functions of the vehicle speed V.

Figure 12A:
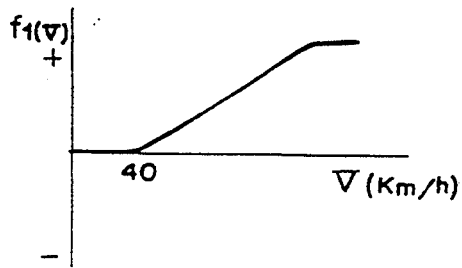
FIGS. 12a to 12c are views showing the characteristics of the coefficients employed in an eighth embodiment.
Figure 12B:
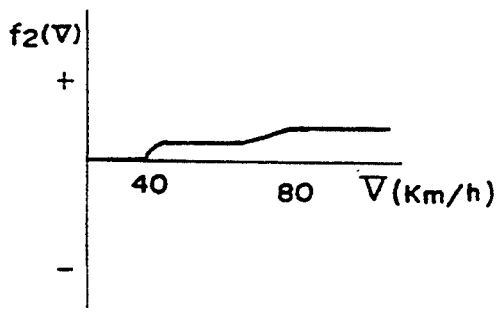
Figure 12C:
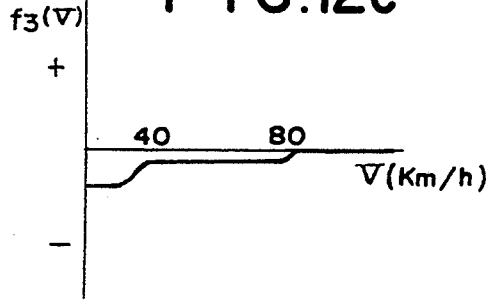
Figure 13A:
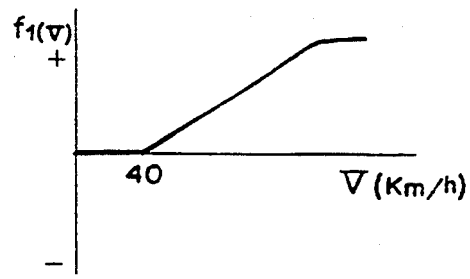
FIGS. 13a to 13d are views showing the characteristics of the coefficients employed in a ninth embodiment.
Figure 13B:
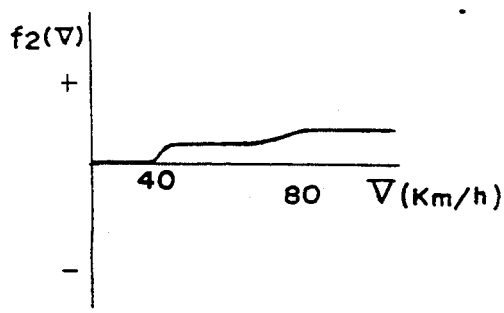
Figure 13C:
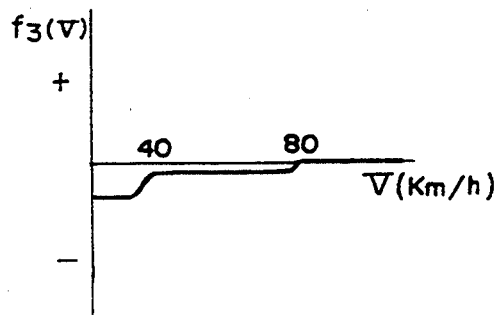
Figure 13D:
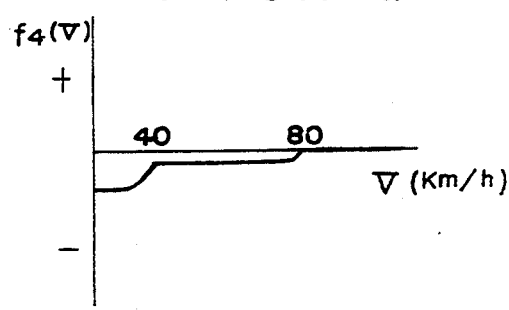

In this embodiment, the coefficients $f_1(V)$, $f_2(V)$ and $f_3(V)$ are related to the vehicle speed V respectively as shown in FIGS. 12a to 12c.

In accordance with the formula (8), by existence of $f_2(V)$ in the second term on the right side, the target rear wheel turning angle ratio $TG\theta_S$ can be kept positive during straight travel of the vehicle and accordingly, running stability during straight travel can be improved in addition to the effect obtained in the sixth embodiment.

A ninth embodiment of the present invention will be described with reference to FIGS. 13a to 13d, hereinbelow.

In this embodiment, the control unit 22 controls the rear wheel turning angle ratio changing mechanism 20 on the basis of a target rear wheel turning angle ratio $TG\theta_S$ defined by the following formula.

$$TG\theta_S = f_1(V)|\Psi'| + f_2(V) + f_3(V)|\theta_F| + f_4(V)|\theta'_F| \quad (9)$$

wherein $\Psi'$ represents the yaw rate, $\theta_F$ represents the front wheel turning angle, $\theta'_F$ represents the rate of change in the front wheel turning angle and $f_1(V)$, $f_2(V)$, $f_3(V)$ and $f_4(V)$ represent coefficients which are functions of the vehicle speed V.

In this embodiment, the coefficients $f_1(V)$, $f_2(V)$, $f_3(V)$ and $f_4(V)$ are related to the vehicle speed V respectively as shown in FIGS. 13a to 13d.

In accordance with the formula (9), by existence of all the control terms employed in the fifth to eighth embodiments, all the effects described in conjunction with the fifth to eighth embodiments can be obtained. The heading performance, the response to control and the running stability during straight travel can be improved.

What is claimed is:

1. A four-wheel turning system for a vehicle comprising
   a front wheel turning mechanism for turning front wheels of the vehicle in response to turning of a steering wheel,
   a rear wheel turning mechanism which is connected to the front wheel turning mechanism by way of a rear wheel turning angle ratio changing mechanism for turning rear wheels of the vehicle, whereby the rear wheels are maintained in the neutral position where the turning angle is zero when the front wheels are in the neutral position,
   the rear wheel turning angle ratio changing mechanism being mechanically connected to both the front wheel turning mechanism and the rear wheel turning mechanism and transmitting a mechanical displacement input thereinto from the front wheel turning mechanism to the rear wheel turning mechanism to drive the same by an amount the ratio of which to the amount of the mechanical displacement input into the rear wheel turning angle ratio changing mechanism gives a predetermined rear wheel turning angle ratio by which the turning angle of the front wheels is multiplied to obtain a target rear wheel turning angle, and
   a control means for controlling the rear wheel turning angle ratio changing mechanism in such a way that, when the front wheels are turned from the neutral position in a middle vehicle speed range, the rear wheel turning angle ratio is made negative for a moment immediately after initiation of turning of the front wheels and is thereafter turned positive.

2. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| - C_2$$

wherein $\Psi'$ represents the yaw rate, and $C_1$ and $C_2$ respectively represent positive coefficients.

3. A four-wheel steering system as defined in claim 2 in which the coefficients $C_1$ and $C_2$ are functions of the vehicle speed.

4. A four-wheel steering system as defined in claim 1 in which said control means controls the rear wheel turning angle ratio changing mechanism on the basis of a target rear wheel turning angle ratio $TG\theta_S$ defined by formula $$TG\theta_S = f_1(V) + f_2(V)|\theta'_F|$$

wherein $\theta'_F$ represents the rate of change in the front wheel turning angle and $f_1(V)$ and $f_2(V)$ are functions of the vehicle speed V, ($f_1(V) > 0$, and $f_2(V) < 0$).

5. A four-wheel steering system as defined in claim 1 in which said control means controls the rear wheel turning angle ratio changing mechanism on the basis of a target rear wheel turning angle ratio $TG\theta_S$ defined by formula $$TG\theta_S = f_1(V)|\theta_F| + f_2(V)|\theta'_F|$$

wherein $\theta_F$ represents the front wheel turning angle, $\theta'_F$ represents the rate of change in the front wheel turning angle and $f_1(V)$ and $f_2(V)$ are functions of the vehicle speed V, ($f_1(V) > 0$, and $f_2(V) < 0$).

6. A four-wheel steering system as defined in claim 1 in which said control means controls the rear wheel turning angle ratio changing mechanism on the basis of a target rear wheel turning angle ratio $TG\theta_S$ defined by formula $$TG\theta_S = f_1(V) + f_2(V)|\theta_F| + f_3(V)|\theta'_F|$$

wherein $\theta_F$ represents the front wheel turning angle, $\theta'_F$ represents the rate of change in the front wheel turning angle and $f_1(V)$, $f_2(V)$ and $f_3(V)$ are functions of the vehicle speed V, ($f_1(V) > 0$, $f_2(V) > 0$ and $f_3(V) < 0$).

7. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| - C_2|\theta_F|$$

wherein $\Psi'$ represents the yaw rate, $\theta_F$ represents the front wheel turning angle, and $C_1$ and $C_2$ respectively represent positive coefficients.

8. A four-wheel steering system as defined in claim 7 in which the coefficients $C_1$ and $C_2$ are functions of the vehicle speed.

9. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| - C_2|\Psi'_F|$$

wherein $\Psi'$ represents the yaw rate, $\theta'_F$ represents the rate of change in the front wheel turning angle and $C_1$ and $C_2$ respectively represent positive coefficients.

10. A four-wheel steering system as defined in claim 9 in which the coefficients $C_1$ and $C_2$ are functions of the vehicle speed.

11. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| + C_2 - C_3|\theta_F|$$

wherein $\Psi'$ represents the yaw rate, $\theta_F$ represents the front wheel turning angle, and $C_1$, $C_2$ and $C_3$ respectively represent positive coefficients.

12. A four-wheel steering system as defined in claim 11 in which the coefficients $C_1$, $C_2$ and $C_3$ are functions of the vehicle speed.

13. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| + C_2 - C_3|\theta'_F|$$

wherein $\Psi'$ represents the yaw rate, $\theta'_F$ represents the rate of change in the front wheel turning angle and $C_1$, $C_2$ and $C_3$ respectively represent positive coefficients.

14. A four-wheel steering system as defined in claim 13 in which the coefficients $C_1$, $C_2$ and $C_3$ are functions of the vehicle speed.

15. A four-wheel steering system as defined in claim 1 in which said control means controls the rear wheel turning angle ratio changing mechanism on the basis of a target rear wheel turning angle ratio $TG\theta_S$ defined by formula $$TG\theta_S = C_1|\Psi'| + C_2 - C_3|\theta_F| - C_4|\psi'_F|$$

wherein $\Psi'$ represents the yaw rate, $\theta_F$ represents the front wheel turning angle, $\theta'_F$ represents the rate of change in the front wheel turning angle and $C_1$, $C_2$, $C_3$ and $C_4$ respectively represent positive coefficients.

16. A four-wheel steering system as defined in claim 15 in which the coefficients $C_1$, $C_2$, $C_3$ and $C_4$ are functions of the vehicle speed.

17. A four-wheel steering system as defined in claim 1 in which a target value for said predetermined rear wheel turning angle ratio is determined on the basis of the yaw rate of the vehicle body.

* * * * *